United States Patent
Weizman

(10) Patent No.: US 8,402,515 B2
(45) Date of Patent: Mar. 19, 2013

(54) APPARATUS AND METHOD FOR ESTABLISHING A PEER-TO-PEER COMMUNICATION SESSION WITH A CLIENT DEVICE

(76) Inventor: Jonathan Weizman, Paris (FR)

( * ) Notice: Subject to any disclaimer, the term of this patent is extended or adjusted under 35 U.S.C. 154(b) by 288 days.

(21) Appl. No.: 12/775,291

(22) Filed: May 6, 2010

(65) Prior Publication Data

US 2011/0277018 A1  Nov. 10, 2011

(51) Int. Cl.
*G06F 17/30* (2006.01)
*G06F 12/16* (2006.01)

(52) U.S. Cl. .................. 726/4; 726/2; 726/27; 713/169; 713/170

(58) Field of Classification Search .................. 726/4
See application file for complete search history.

(56) References Cited

U.S. PATENT DOCUMENTS

| | | | |
|---|---|---|---|
| 2006/0039356 A1 | 2/2006 | Rao et al. | |
| 2006/0182100 A1 | 8/2006 | Li et al. | |
| 2006/0221996 A1* | 10/2006 | de Froment | 370/463 |
| 2007/0097885 A1 | 5/2007 | Traversat et al. | |
| 2007/0165629 A1* | 7/2007 | Chaturvedi et al. | 370/389 |
| 2008/0005290 A1 | 1/2008 | Nykanen et al. | |
| 2008/0316951 A1* | 12/2008 | Zeng et al. | 370/312 |
| 2009/0175165 A1 | 7/2009 | Leighton | |
| 2010/0040057 A1 | 2/2010 | Ko | |
| 2010/0146126 A1* | 6/2010 | Lin et al. | 709/228 |

* cited by examiner

*Primary Examiner* — Taghi Arani
*Assistant Examiner* — Mohammad L Rahman
(74) *Attorney, Agent, or Firm* — David V. Jafari

(57) ABSTRACT

An apparatus and method of establishing a peer-to-peer communication session between a host device and a client device. Routing information of the client device is received from the server by a host device, communication with the server is maintained, and authentication information from the client device is received by the host device. Peer-to-peer communication is transmitted to the client device via the wide area network if the client device is authenticated for peer-to-peer communication by the host device.

25 Claims, 12 Drawing Sheets

APPARATUS AND METHOD FOR ESTABLISHING A PEER-TO-PEER COMMUNICATION SESSION WITH A CLIENT DEVICE

TECHNICAL FIELD OF THE INVENTION

The present invention relates in general to electronic communication and data transfer, and more specifically, to an apparatus and method for establishing a peer-to-peer communication session between a host device and a client device separated by a wide area network.

BACKGROUND OF THE INVENTION

Currently there are few options available should one want to access electronic files from a remote location. While one may store their electronic documents on a public or private server at a remote location, this method has significant drawbacks. Should the server ever crash, files may become corrupted, deleted, or in the best case scenario, temporarily unavailable. Further, remote data storage on a third-party server is costly, potentially subjecting one to fees or unwanted advertisements. Most worrisome, however, is that the storage of files on a remote server may pose security risks.

An alternative method to remote data storage on a third-party server is the utilization of a peer-to-peer communication session to access documents from a remote location. However, current methods for the initialization of a peer-to-peer communication session between electronic devices on local area networks separated by a wide area network are limited. If one were on a local area network separated from the internet by a network address translator, commonly referred to as a NAT, their device would not be detectable to devices on the wide area network. As such, in order to initiate a peer-to-peer communication session between a first and a second communication device on local area networks separated by a wide area network, one must either leave a port in their network address translator permanently open for incoming communication transmissions, place their files in an unsecured location, or utilize a relay server to route the data to its intended destination, thereby not initializing a peer-to-peer communication session at all.

These alternatives, however, have significant drawbacks. The best current option for the initialization of a peer-to-peer communication session between electronic devices, leaving a port permanently open in a network address translator, creates high security risks for devices on the local area network. Permanently opened ports create high risks of a security breach in the local area network, allowing unwanted or unauthorized communication through the network address translator, increasing the risk that data or system performance may be compromised by third party devices or programs, such as viruses, worms, or spy ware.

Furthermore, the utilization of a relay server to transfer data from a first communication device to a second communication device also creates high risks of data exposure to harmful third parties and other breaches of confidentiality. Should the relay server store or copy data, or should the relay server allow a third party to listen in on the relayed data, the data may be compromised. Moreover, utilization of a relay server imposes additional bandwidth costs. As such, there is a need for a method and system for establishing a peer-to-peer communication session between a first and a second communication device on local area networks separated by the wide area network that does not create the risks of the current methods.

Current methods of file sharing between devices on local area networks separated by a wide area network, such as the internet, are limited. There is a need in the art for an apparatus and method for establishing a peer-to-peer communication session between electronic devices over a wide area network. Specifically, there is a need for a device that facilitates a direct peer-to-peer communication session between a host device and a client device on different local area networks separated by the wide area network. It is to these ends that the present invention has been developed.

SUMMARY OF THE INVENTION

To minimize the limitations in the prior art, and to minimize other limitations that will be apparent upon reading and understanding the present specification, the present invention describes a method of establishing a peer-to-peer communication session with a client device by a host device, comprising sending routing information of the host device to a server coupled to a wide area network, receiving routing information of the client device from the server, communicating with the server to maintain availability of a port, receiving authentication information of the client device from the client device via the wide area network, and sending peer-to-peer communications to the client device via the wide area network if the client device is authenticated for peer-to-peer communication.

The present invention also describes a host device for establishing a peer-to-peer communication session with a client device coupled to a wide area network, adapted to send routing information of the host device to a server coupled to the wide area network, receive routing information of the client device from the server, communicate with the server to maintain availability of a port, receive authentication information of the client device from the client device via the wide area network, and send peer-to-peer communications to the client device via the wide area network if the client device is authenticated for peer-to-peer communication.

The present invention further describes a computer-readable medium including codes executable by a processor, for sending routing information of the host device to a server coupled to a wide area network, receiving routing information of the client device from the server, communicating with the server to maintain availability of a port, receiving authentication information of the client device from the client device via the wide area network, and sending communication to the client device via the wide area network if the client device is authenticated for peer-to-peer communication.

It is an objective of the present invention to provide an effective method for the initiation of a peer-to-peer communication session between electronic devices on separate local area networks.

It is another objective of the present invention to provide a system for establishing a peer-to-peer communication session between a host device and a client device.

It is yet another objective of the present invention to provide a computer-readable medium adapted to provide routing information of the host device to a server, maintain communication with the server, and receive authentication information of a client device form the client device via a wide area network, in order to establish a peer-to-peer communication session between the first and second communication devices.

Finally, it is yet another objective of the present invention to reduce the risk of a private network security breach, or some other data security compromise, from a third-party as a result of attempts to initiate a peer-to-peer communication session between a first and a second communication device.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE DRAWINGS

In the following discussion that addresses a number of embodiments and applications of the present invention, reference is made to the accompanying drawings that form a part hereof, where depictions are made, by way of illustration, of specific embodiments in which the invention may be practiced. It is to be understood that other embodiments may be utilized and changes may be made without departing from the scope of the present invention.

In the present disclosure, peer-to-peer communication may comprise communication or data transmission between two devices in direct connection over a network, without data transmission relayed through a server or another third party device.

A local area network ("LAN") may comprise a network of computers or other electronic devices within a home, office, or other location, wherein the network is separated or kept private from a wide area network ("WAN"), by a router, network hub, or network address translator ("NAT"). A WAN may comprise a broad computer network, such as the internet, that may connect multiple devices or LANs together.

An internet protocol ("IP") address may comprise a numeric label used to identify specific devices or locations on a network. A public IP address is an identifier that may be used to identify a device or location on a WAN, most typically assigned to public servers or NATs used to separate private networks from the WAN. A private IP address is an IP address assigned to a device for identification within a LAN, separated from the WAN by a NAT.

A NAT may comprise a device used for the modification of a network address header in data packets transmitted between a device on LAN and the WAN. NATs allow a single public IP address to be used by many devices on a LAN, redirecting and re-labeling incoming and outgoing communications to hide private IP address information from the WAN. Additionally, NAT devices may forward application or process specific ports from one network node to another.

In the context of the present application, an open port may comprise a port allowing for the data packet to be accepted or to pass through to its intended destination. In contrast, a closed port may comprise a port wherein data packets will be denied, and will not be received at the intended destination.

Figure 1A:
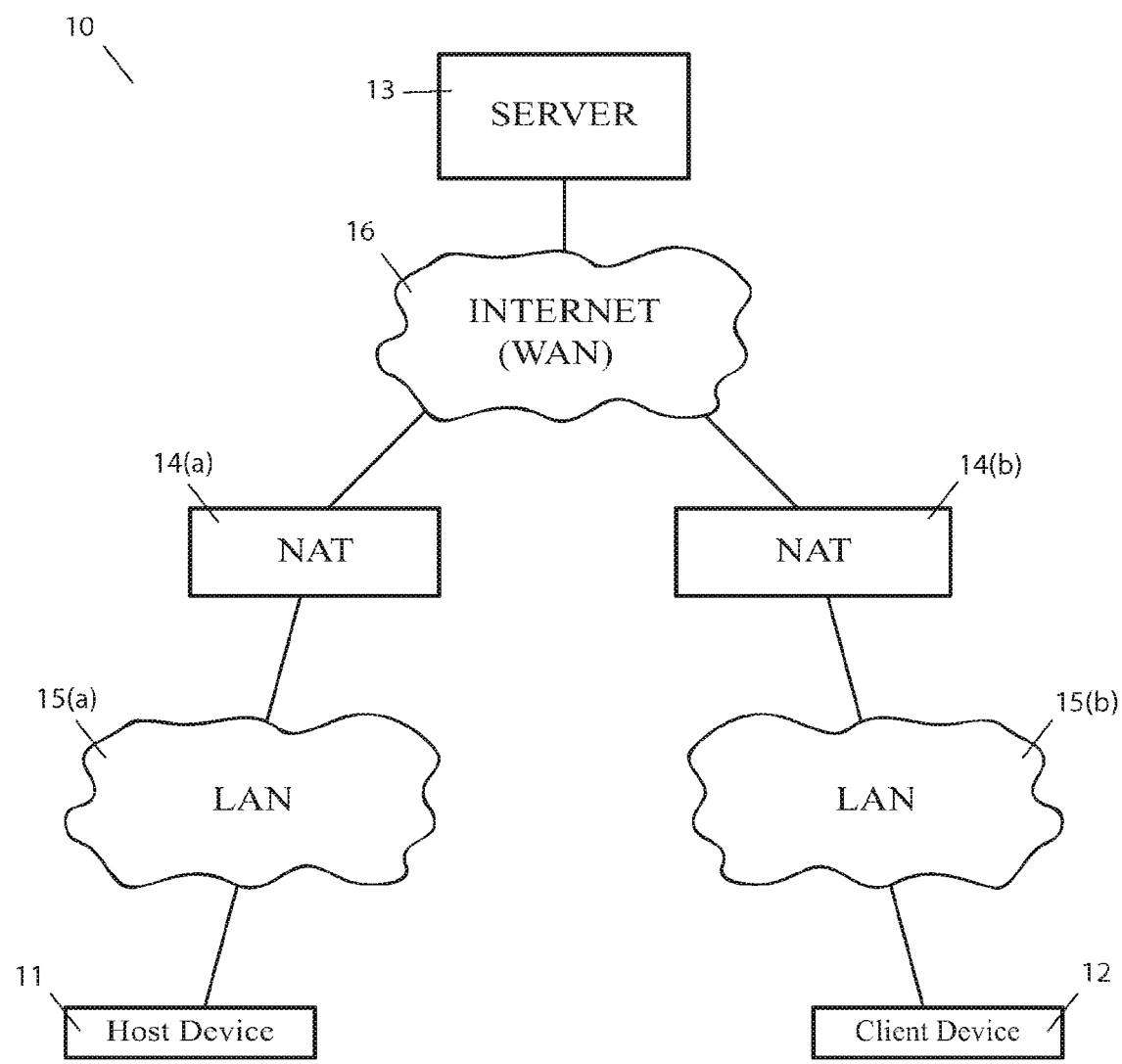
FIG. 1(a) illustrates a block diagram of an exemplary embodiment of a system for establishing a peer-to-peer communication session.
Figure 1B:
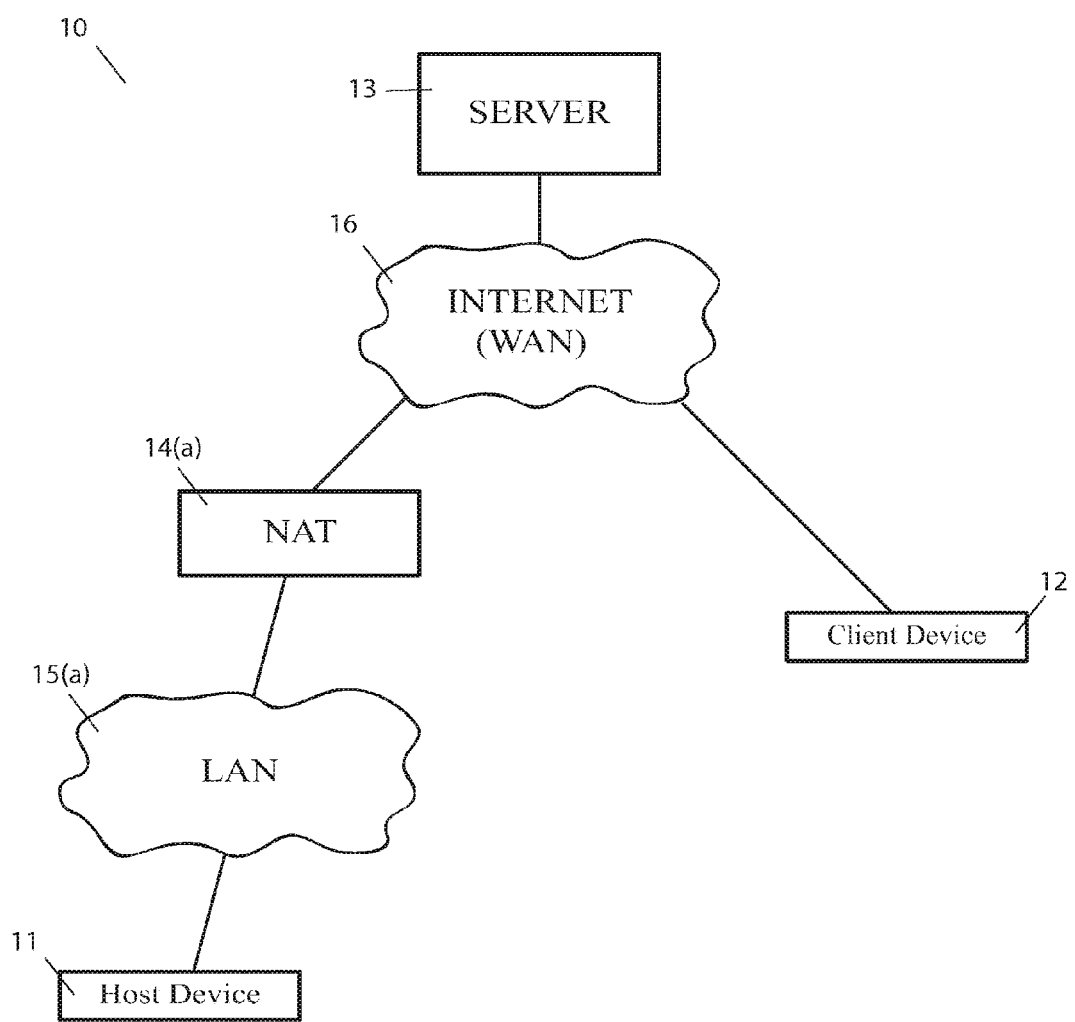
FIG. 1(b) illustrates a block diagram of another exemplary embodiment of a system for establishing a peer-to-peer communication session.

Now referring to the drawings, FIG. 1(a) illustrates a block diagram of an exemplary embodiment of a system for establishing a peer-to-peer communication session. FIG. 1(b) illustrates a block diagram of an alternative embodiment of a system for establishing a peer-to-peer communication session. Both FIGS. 1(a) and 1(b) depict system 10, which comprises host device 11, client device 12, and server 13. System 10 is designed to facilitate the establishment of a peer-to-peer communication session between host device 11 and client device 12.

Host device 11 is a component of system 10 designed to send and receive peer-to-peer communications with client device 12 over WAN 16. In an exemplary embodiment, of the present invention, host device 11 is hidden from devices on WAN 16 behind NAT 14(a). To devices on WAN 16, any communication from host device 11 is seen as being sent from the public IP address of NAT 14(a). In embodiments utilizing NAT 14(a), all communications transmitted from and sent to host device 11 may pass through NAT 14(a).

As illustrated in FIGS. 1(a) and 1(b), host device 11 is connected to LAN 15(a). LAN 15(a), and all devices that may be located within it, is separated from WAN 16 by NAT 14(a). Devices on LAN 15(a) are typically identified by a private IP address utilized by NAT 14(a) to differentiate devices located behind NAT 14(a). In an exemplary embodiment, host device 11 may be assigned a unique private IP address by NAT 14(a). In order for host device 11 to communicate with a device not within LAN 15(a), the communication may traverse LAN 15(a), NAT 14(a), and WAN 16 in order to reach the intended recipient. To receive a communication from outside LAN 15(a), the communication must pass through NAT 14(a), and host device 11 must be anticipating the incoming data communication. Should host device 11 not be waiting for a data transmission, the communication will be blocked by NAT 14(a).

Client device 12 is a component of system 10 designed to initiate a peer-to-peer communication session with host device 11 for data transfer over WAN 16. In the exemplary embodiment depicted in FIG. 1(a), client device 12 may be a component on LAN 15(b), hidden from devices on WAN 16 behind NAT 14(b). In such an embodiment, for client device 12 to communicate with a device not within LAN 15(b), the communication may traverse LAN 15(*b*), NAT 14(*b*), and WAN 16 in order to reach its intended recipient. In an alternative embodiment of the present invention, as depicted in FIG. 1(*b*), client device 12 may directly connect to WAN 16.

To initiate a peer-to-peer communication session between host device 11 and client device 12, both host device 11 and client device 12 must learn their own routing information and the routing information of the other respective device in order to initiate peer-to-peer communication. As such, both host device 11 and client device 12 are designed to communicate with server 13. Server 13 is a component of system 10 designed to facilitate a peer-to-peer communication session between host device 11 and client device 12. Server 13 may have a static IP address, such that host device 11 and client device 12 may know its location in order to initiate communication with server 13.

In exemplary usage of the present invention, host device 11 and client device 12 may communicate with server 13 over WAN 16. To facilitate a peer-to-peer communication session, server 13 exchanges the routing information of both host device 11 and client device 12 to host device 11 and client device 12, respectively. Routing information of host device 11 and client device 12 may comprise the media access control ("MAC") address of the host device, Transmission Control Protocol ("TCP") private IP address, TCP public IP address, and User Datagram Protocol ("UDP") public address. The UDP public address comprises the public IP address and port number. With such routing information, host device 11 and client device 12 may initiate direct peer-to-peer communication.

Figure 2A:
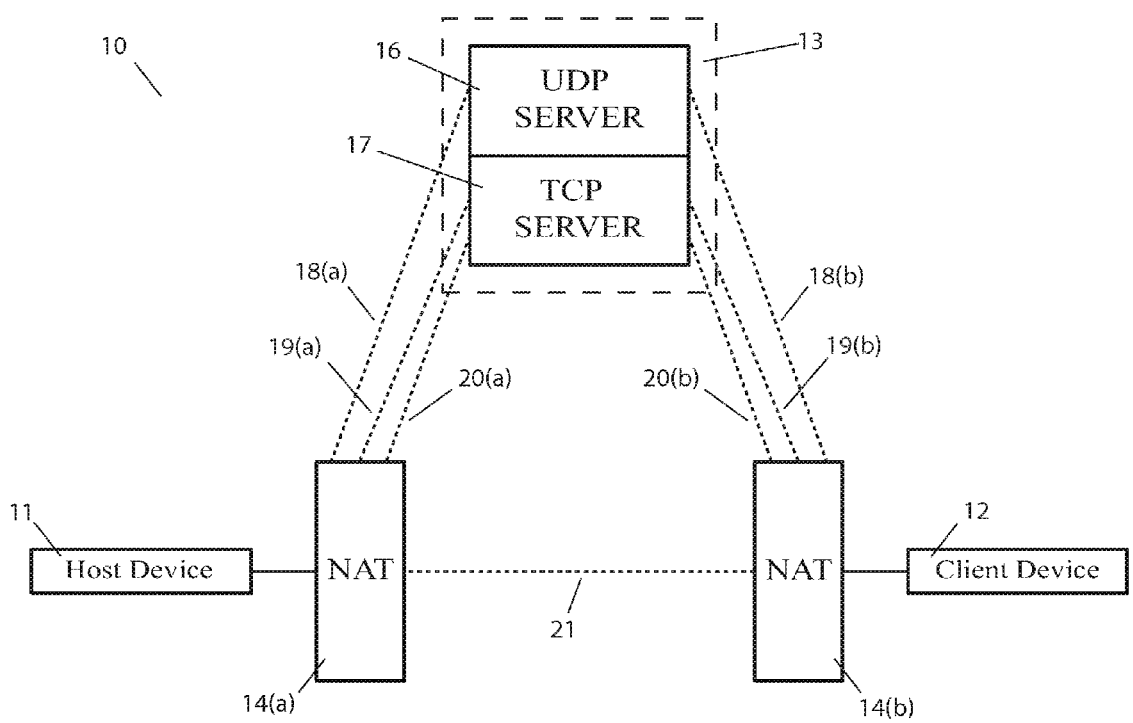
FIG. 2(a) illustrates a block diagram of an exemplary embodiment of communication between components of a system for establishing a peer-to-peer communication session.

FIG. 2(*a*) illustrates a block diagram of an exemplary embodiment of communication between components of a system for establishing a peer-to-peer communication session. FIG. 2(*a*) shows system 10, comprising host device 11, client device 12, and server 13, which may comprise UDP server 16 and TCP server 17. FIG. 2(*a*) further emphasizes Session Traversal Utilities for NAT ("STUN") message 18(*a*), STUN message 18(*b*), TCP registration 19(*a*), TCP registration 19(*b*), routing information message 20(*a*), routing information message 20(*b*), and request 21. The components of system 10 are designed to communicate to facilitate the establishment of a peer-to-peer communication session between host device 11 and client device 12.

To conduct peer-to-peer communication, both host device 11 and client device 12 are provided with their own respective UDP public address. In an exemplary embodiment, to discover their UDP public address, both host device 11 and client device 12 send STUN message queries to UDP server 16, which is located on the opposing side of the NAT of each respective device.

For the purposes of the present invention, a STUN message is a query sent by a device on a LAN to UDP server 16 on the opposing side of the NAT separating the device from the WAN, requesting its UDP public address. UDP server 16 is a component of server 13 that, in response to a STUN message query, sends a data packet to the querying device containing the UDP public address of the device.

As such, to discover its UDP public address, host device 11 sends STUN message 18(*a*) to UDP server 16. In response to STUN message 18(*a*), UDP server 16 sends host device 11 a data packet containing the UDP public address of host device 11. In an exemplary embodiment, host device 11 may continuously send STUN message 18(*a*) to UDP server 16 in frequent intervals, so that host device 11 may learn its new public IP address, should the address change. Likewise, client device 12 sends STUN message 18(*b*) to UDP server 16. In response to STUN message 18(*b*), server 13 sends client device 12 a data packet containing the UDP public address of client device 12. Client device 12 may continuously send STUN message 18(*b*) to UDP server 16 in order to discover its UDP public address, should the address change.

Host device 11 completes TCP registration 19(*a*) by transmitting its MAC address and TCP private IP address to TCP server 17. Client device 12 completes TCP registration 19(*b*) by transmitting its TCP private IP address and the MAC address of host device 11 to TCP server 17. TCP server 17 is a component of server 13 which receives and records the routing information from host device 11 and client device 12. As such, TCP registration 19(*a*) and TCP registration 19(*b*) both comprise of the MAC address of host device 11, however, TCP registration 19(*a*) includes the TCP private IP address of host device 11, and TCP registration 19(*b*) includes the TCP private IP address of client device 12.

When server 13 recognizes a matching pair of devices based upon registration of the MAC address of host device 11, server 13 forwards the routing information of client device 12 to host device 11 by way of TCP server 17. Server 13 also forwards the routing information of host device 11 to client device 12 by way of TCP server 17. Server 13 provides routing information to host device 11 through routing information message 20(*a*). Server 13 provides routing information to client device 12 through routing information message 20(*b*).

When client device 12 is provided the routing information of host device 11, it sends request 21 to host device 11, requesting to initiate a peer-to-peer communication session. Should host device 11 authorize client device 12 for peer-to-peer communication, peer-to-peer communication may commence.

In another exemplary embodiment of the present invention, host device 11, after it has received the routing information of client device 12, may attempt to initiate a peer-to-peer communication session with client device 12. Host device 11 may send request 21 to client device 12, requesting an authentication identifier from client device 12, which is necessary in order to initiate peer-to-peer communication. An authentication identifier may comprise a unique identifier, such as a MAC address, serial number, username or password. Should host device 11 authorize client device 12 for peer-to-peer communication, peer-to-peer communication between host device 11 and client device 12 may commence.

FIG. 2(*b*) illustrates flow diagrams of processes utilized by system 10 for establishing a peer-to-peer communication session between host device 11 and client device 12, in accordance with one embodiment of the present invention. FIG. 2(*b*) shows rendezvous process 100, authentication process 120, authentication process 140, and peer-to-peer communication session 160. Rendezvous process 100, authentication process 120, and authentication process 140 are explained in the orders described below; however, the following steps may be taken in any other conceivable sequence without deviating from the scope of the present invention.

Rendezvous process 100 is utilized by system 10 to transfer the routing information of client device 12 to host device 11 and the routing information of host device 11 to client device 12. In an exemplary embodiment of the present invention, rendezvous process 100 may repeat continuously, as long as host device 11 and client device 12 are able to communicate with server 13, even after peer-to-peer communication has been established. In the embodiment illustrated in FIG. 2(*b*), rendezvous process 100 comprises steps 101-108.

In step 101, host device 11 sends STUN message 18(*a*) and TCP registration 19(*a*) to server 13, as previously described for FIG. 2(*a*). In step 102, server 13 checks the memory of TCP server 17 to see if client device 12 has already registered with the MAC address of host device 11. If there is no other device on record with such a MAC address, server 13 records the MAC address of host device 11 in the memory of TCP server 17 and proceeds to step 103. If client device 12 has already registered the MAC address of host device 11, then server 13 recognizes the paired devices and proceeds to steps 107 and 108.

In step 103, server 13, in response to STUN message 18(a) sent by host device 11, transfers the public IP address and port number of host device 11 to host device 11. As long as host device 11 is online and able to communicate with server 13, host device 11 and server device 13 will repeat steps 101-103.

In step 104, client device 12 may send STUN message 18(b) and TCP registration 19(b) to server 13, as previously described above for FIG. 2(a). In step 105, server 13 checks the memory of TCP server 17 to see if host device 11 has already registered. If host device 11 has already registered its MAC address with TCP server 17, then server 13 will recognize the paired devices and proceeds to steps 107 and 108. If, however, host device 11 has not registered with server 13 prior to client device 12, server 13 records the MAC address of host device 11 in the memory of TCP server 17, as transmitted by client device 12. Until both host device 11 and client device 12 are simultaneously in communication with server 13, sending STUN messages to server 13, system 10 cannot yet proceed to steps 107 and 108.

In step 106, server 13, in response to STUN message 18(b) sent by client device 12, transfers the public IP address and port number of client device 12 to client device 12. As long as client device 12 is online and able to communicate with server 13, client device 12 and server device 13 will repeat steps 104-106. Further, in other embodiments of the present invention, steps 104-105 may occur before or simultaneously with steps 101-103.

In step 107, server 13 transmits routing information 20(a) to host device 11. In step 108, server 13 transmits routing information 20(b) to client device 12. Note, however, in other embodiments of the present invention, server 12 may perform step 108 before or simultaneously with step 107. Once steps 107 and 108 have been completed, with routing information 20(a) and 20(b) transferred to host device 11 and client device 12, system 10 proceeds to authentication process 120, or in other embodiments of the present invention, authentication process 140.

Authentication process 120 is utilized by system 10 to authorize and initiate a peer-to-peer communication session between host device 11 and client device 12. In the embodiment illustrated in FIG. 2(b), authentication process 120 comprises steps 121-123.

In step 121, client device 12 directly communicates with host device 11, sending request 21 to initiate a peer-to-peer communication session and its authentication identifier. Should host device 11 receive request 21, sent by client device 12, system 10 proceeds to step 122. However, should host device 11 not receive request 21 from client device 12, system 10 cannot proceed to step 122, but instead may initiate authentication process 140. Client device 12 may repeat step 121 until it receives a response from host device 11.

In step 122, host device 11 compares the authentication identifier of client device 12 with identifiers of authorized devices stored in the memory of host device 11. Should the authentication identifier of client device 12 match that of an authorized device stored in the memory of host device 11, then client device 12 is authorized for peer-to-peer communication. If, however, the authentication identifier of client device 12 is not found in the memory of host device 11, then client device 12 is not authorized for peer-to-peer communication.

In step 123, host device 11 replies to client device 12, either approving or denying a request to initiate a peer-to-peer communication session. If authentication of client device 12 is approved by host device 11, then system 10 proceeds to peer-to-peer communication session 160. Should authentication be denied by host device 11, then peer-to-peer communication with client device 12 is terminated.

Authentication process 140 is an alternative authentication process utilized by system 10 to authorize and initiate a peer-to-peer communication session between host device 11 and client device 12. In the embodiment illustrated in FIG. 2(b), authentication process 140 comprises steps 141-144.

In step 141, host device 11 sends request 21 to initiate a peer-to-peer communication session, requesting an authentication identifier from client device 12. Should the request sent by host device 11 be received by client device 12, system 10 will proceed to step 142. Until host device 11 receives a response from client device 12, host device 11 may repeat step 141.

In step 142, client device 12 responds to host device 11 by transferring its authentication identifier. Should host device 11 receive the authentication identifier sent by client device 12, system 10 will proceed to step 143. Until client device 12 receives a response from host device 11, client device 12 may repeat step 141. Additionally, should client device 12 not receive a response from host device 11, client device 12 may initiate authentication process 120.

In step 143, host device 11 compares the authentication identifier of client device 12 with identifiers of authorized devices stored in the memory of host device 11. Should the authentication identifier of client device 12 match that of an authorized device stored in the memory of host device 11, then client device 12 is authorized for peer-to-peer communication. If, however, the authentication identifier of client device 12 is not found in the memory of host device 11, then client device 12 is not authorized for peer-to-peer communication.

In step 144, host device 11 replies to client device 12, either approving or denying a request to initiate a peer-to-peer communication session. If authentication of client device 12 is approved by host device 11, then system 10 proceeds to peer-to-peer communication session 160.

Peer-to-peer communication 160 is a form of communication between host device 11 and client device 12 wherein data is transferred directly between the devices, without the need for a relay server. At anytime during peer-to-peer communication 160, should communication be interrupted or routing information for either host device 11 or client device 12 is altered, authentication process 120 or authentication process 140 may be reinitialized to reestablish peer-to-peer communication 160.

Figure 2B:
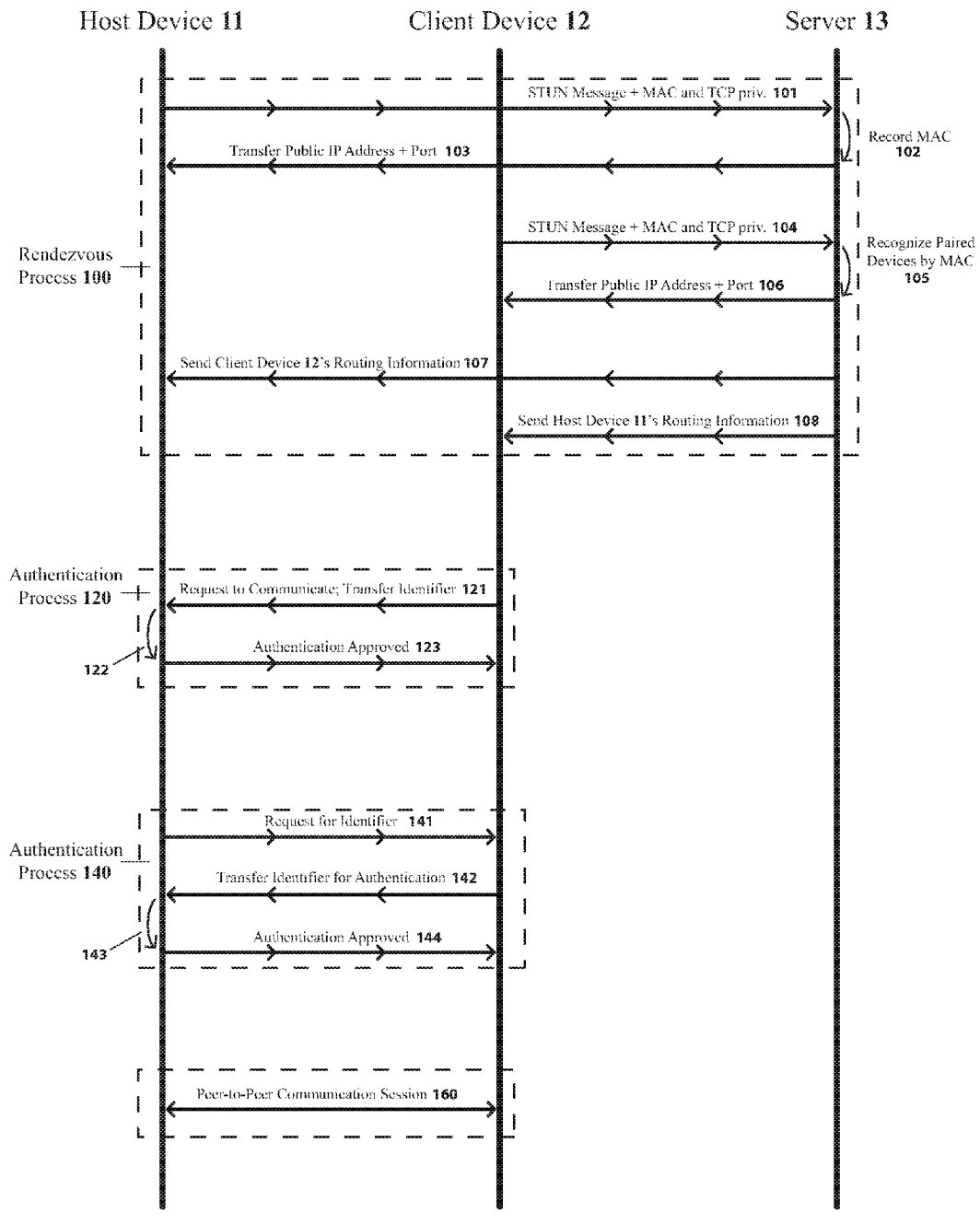
FIG. 2(b) illustrates a flow diagram of methods utilized by a system for establishing a peer-to-peer communication session.
Figure 2C:
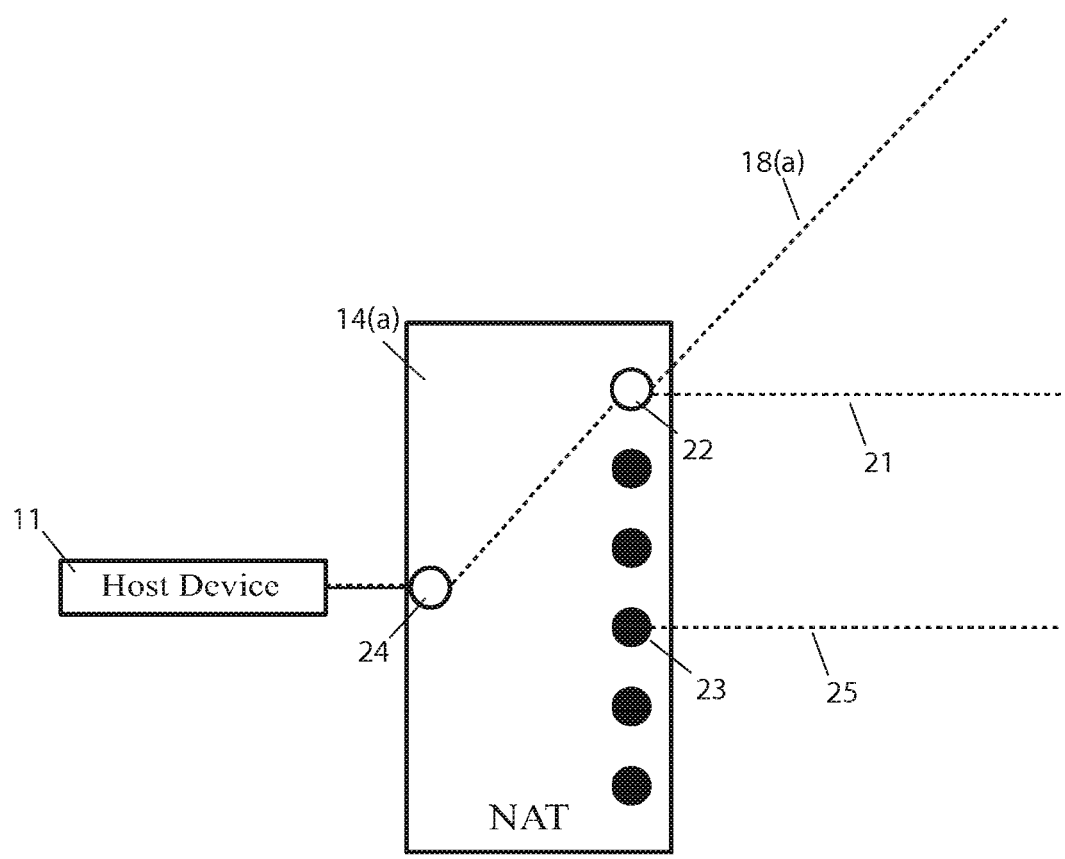
FIG. 2(c) illustrates a block diagram of a network address translator communicating with third party devices.

FIG. 2(c) illustrates a block diagram of NAT 14(a) communicating with third party devices. FIG. 2(c) shows NAT 14(a), comprising open port 22, closed port 23 and translated port 24. NAT 14(a) translates STUN message 18(a) from host device 11 to UDP server 16 and allows request 21 through open port 22 to reach host device 11, but denies communication 25 from reaching host device 11.

Open port 22 is a component of NAT 14(a) which allows expected communications from WAN 16 to reach devices on LAN 15(a), such as host device 11. In exemplary performance of NAT 14(a), ports are left closed, such as closed port 23. Only when a communication is expected is a port left open. In an exemplary performance the present invention, when STUN message 18(*a*) is sent to UDP server 16, both host device 11 and NAT 14(*a*) expect a response communication from UDP server 16. As a result, NAT 14(*a*) allows access to open port 22 in order to receive communication from UDP server 16.

Translated port 24 is the private port address that NAT 14(*a*) routes communications that were not blocked by closed port 23. Should a communication pass through open port 22, NAT 14(*a*) translates the destination information within the communication such that the communication may lead to translated port 24.

Communications from devices on WAN 16 that are not expected by will not be allowed to reach LAN 15(*a*). As illustrated, communication 25 may be blocked by closed port 23 because it is not directed to open port 22. Should communication 25 be directed at open port 22, however, it may be permitted to pass through to LAN 15(*a*) only if it contained routing information 20(*b*), which is necessary to pass through open port 22.

In exemplary usage of the present invention, request 21 may pass through open port 22 because request 21 contains routing information 20(*b*) in its destination information. NAT 14(*a*) allows request 21 to pass through to host device 11, even though request 21 was not sent from UDP server 16 in response to STUN message 18(*a*) because client device 12 tailored request 21 to include routing information 20(*b*). Because client device 12 was provided with the TCP private address of host device 11 in routing information 20(*b*), request 21 is approved by NAT 14(*a*) to be transmitted to host device 11.

Figure 3A:
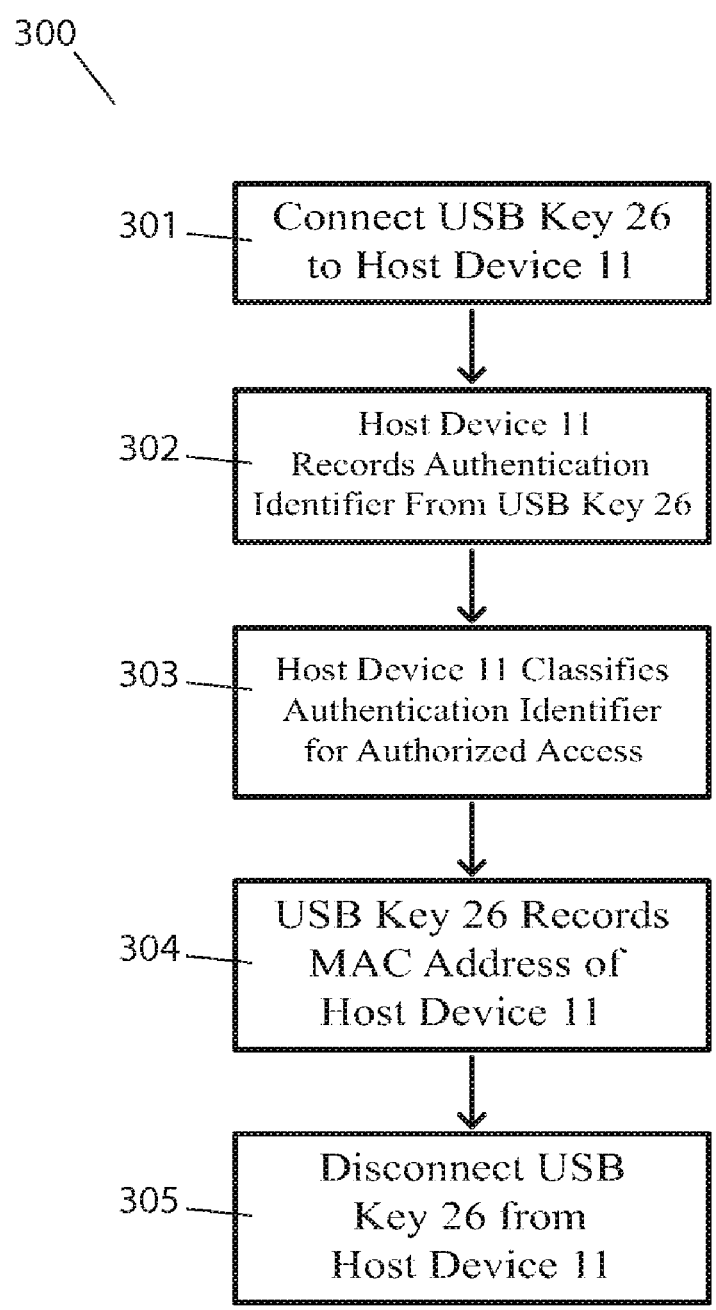
FIG. 3(a) illustrates a flow chart of a method utilized for the initial authorization pairing necessary for establishing a peer-to-peer communication session.
Figure 3B:
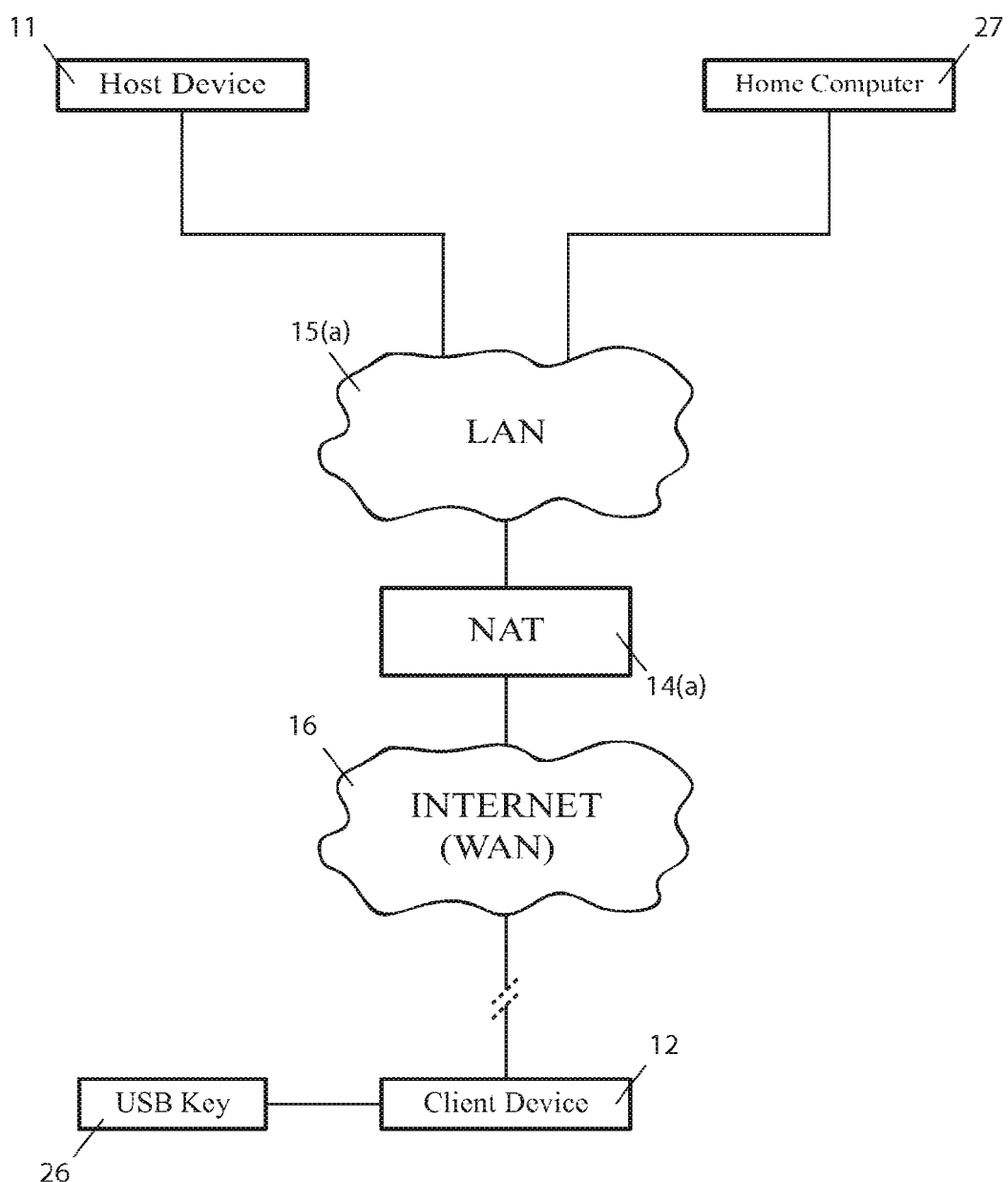
FIG. 3(b) illustrates as block diagram of an exemplary network setup utilized by a host device and a client device for the establishment of a peer-to-peer communication session.

FIG. 3(*a*) explains an initial pairing procedure in order for host device 11 to recognize and authorize client device 12 for peer-to-peer communication. In order for host device 11 to authorize client device 12, host device 11 must possess the authentication identifier of client device 12. In an exemplary embodiment of the present invention, client device 12 may comprise a Universal Serial Bus ("USB") compatible device, or USB key 26, illustrated in FIG. 3(*b*), containing an authentication identifier, such as a serial number. In such embodiments, as explained below, USB key 26 of client device 12 may be connected to host device 11 for initial pairing. In other embodiments of the present invention, however, client device 12 may comprise some other electronic device, such as a PDA or smart device, thereby requiring a different method of initial pairing, such as inputting the authentication identifier via a keyboard interface.

FIG. 3(*a*) illustrates a flow chart of method 300 utilized by host device 11 and a USB key for the initial authorization pairing necessary for establishing a peer-to-peer communication session between host device 11 and client device 12. Method 300 is explained in the order shown below; however, the following steps may be taken in any other conceivable sequence without deviating from the scope of the present invention.

In step 301, USB key 26 of client device 12 is connected to host device 11. In exemplary usage of the present invention, USB key 26 may be plugged into a USB port of host device 11. In other embodiments of the present invention, client device 12 may connect to host device 11 via direct peer-to-peer communication, such as BLUETOOTH®, or over LAN 15(*a*). In step 302, the authentication identifier of USB key 26 is recorded in the memory of host device 11.

In an exemplary embodiment of the present invention, recorded authentication identifiers within the memory of host device 11 are classified for unauthorized access to host device 11. In step 303, host device 11 reclassifies the authentication identifier of USB key 26 stored in the memory of host device 11 for authorized communication with host device 11. In another embodiment of the present invention, recorded authentication identifiers stored within the memory of host device 11 may be reclassified from authorized to unauthorized, or vice versa.

In step 304, USB key 26 records the MAC address of host device 11 into its memory. As previously described, in an exemplary embodiment of the present invention, client device 12 submits the MAC address of host device 11 to server 13 in order to receive the routing information of host device 11 necessary for initialization of a peer-to-peer communication session.

Finally, in step 305, USB key 26 is disconnected from host device 11. Should a user of the present invention intend to establish a peer-to-peer communication session with host device 11, the user must first connect USB key 26 to their electronic device in order to authorize it for peer-to-peer communication access. In the event that USB key 26 is not plugged into the user's electronic device, or in another embodiment of the present invention should authorized software not be installed and running, then the electronic device will not be authorized for peer-to-peer communication with host device 11.

FIG. 3(*b*) illustrates a block diagram of an exemplary network setup utilized by host device 11 and client device 12 for the establishment of a peer-to-peer communication session through NAT 14(*a*) and WAN 16. FIG. 3(*b*) shows client device 12, utilizing USB key 26, and host device 11, communicating through NAT 14(*a*) and WAN 16. Additionally, host device 11 may communicate with home computer 27 over LAN 15(*a*).

In an exemplary embodiment of the present invention, host device 11 may comprise a network connected data storage device, located on LAN 15(*a*), such as a network hard drive or data storage server. As previously described for FIG. 3(*a*), host device 11 is initially paired with USB key 26 for peer-to-peer communication authorization. When host device 11 is connected to LAN 15(*a*), it may be accessible for peer-to-peer communication with client device 12.

In the embodiment of the present invention illustrated in FIG. 3(*b*), client device 12 may comprise any network accessible electronic device, such as a personal computer, notebook computer, smart phone or personal digital assistant, and USB key 26, provided that the electronic device may access USB key 26. Client device 12 may communicate with host device 11 over WAN 16 and through NAT 14(*a*). As previously described, client device 12 need be authorized for peer-to-peer communication with host device 11 in order initiate a peer-to-peer communication session through NAT 14(*a*), and need to communicate with server 13 in order to learn the routing information of host device 11 in order to initiate a peer-to-peer communication session.

Communication between host device 11 and devices on LAN 15(*a*) behind NAT 14(*a*), and separate from WAN 16, however, may not require the provision of routing information or an authorization identifier. In an exemplary embodiment, home computer 27 may initiate a peer-to-peer communication session with host device 11 on LAN 15(*a*) without the need to provide routing information or an authorization identifier. Because host device 11 is not hidden from personal computer 27 by NAT 14(*a*), host device 11 may be accessible and visible on LAN 15(*a*) and may be communicated with by home computer 27 without the need for a complex peer-to-peer communication session initiation procedure. In the present example, home computer 27 may comprise a network accessible electronic device. In exemplary embodiments, home computer 27 may comprise a personal computer, notebook computer, smart phone or personal digital assistant, or other electronic device capable of network.

Figure 4A:
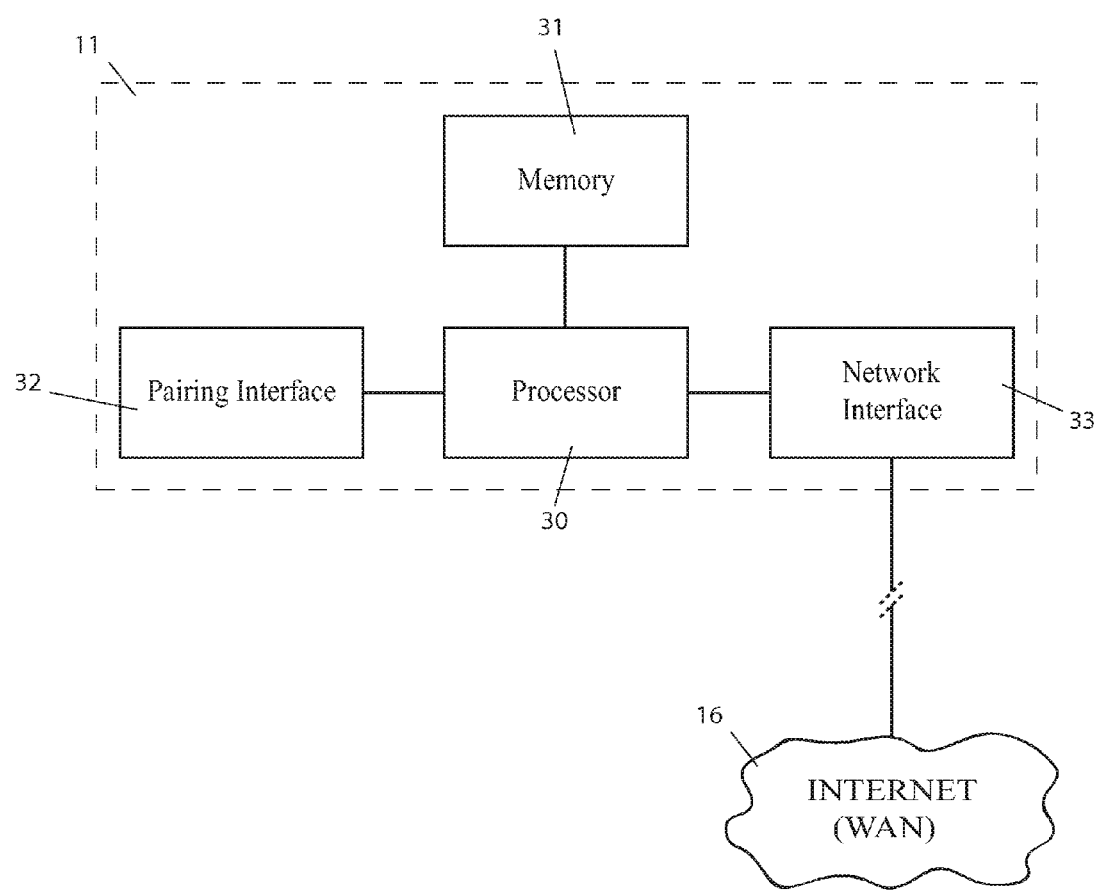
FIG. 4(a) illustrates a block diagram of an exemplary embodiment of a host communication device.

FIG. 4(a) illustrates a block diagram of an exemplary embodiment of the internal components of host device 12. FIG. 4(a) shows host device 11, comprising processor 30, memory 31, pairing interface 32, and network interface 33, connected to an external network, such as WAN 16. Host device 11, however, may comprise other internal or external components and not depart from the scope of the present invention. Host device 11 is designed to initiate a peer-to-peer communication session with client device 12 over WAN 16.

Processor 30 is a component of host device 11 that governs the functionality of host device 11. All data inputs and command instructions from external devices through network interface 33 may ultimately be relayed through processor 30. In an exemplary embodiment of the present invention, processor 30 instructs network interface 33 to communicate with external devices.

Memory 31 is a component of host device 11 wherein data is stored and accessed for peer-to-peer communication with client device 12. Processor 30 may access data stored in memory 31 for transmission through peer-to-peer communication, or for authorization of client device 12. Additionally, processor 30 may access memory 31 to record, modify, or delete data stored within in memory 31. Data stored in memory 31 may be transferred through network interface 33 via processor 30.

Pairing interface 32 is a component of host device 11 wherein external devices may be connected with host device 11 for initial pairing and authorization, as previously discussed for FIG. 3(a). In an exemplary embodiment of the present invention, pairing interface 32 may comprise a USB receiver port, wherein a USB key such as USB key 26 may be plugged into pairing interface 32 such that processor 30 may store the authentication identifier of the USB key within memory 31. Additionally, processor 30 may instruct pairing interface 32 to record the MAC address of network interface 33 within the memory of the USB key for later rendezvous between client device 12 and server 13. In another embodiment of the present invention, pairing interface 32 may comprise a keyboard interface, wherein a user of host device 11 may key in the authentication identifier of client device 12 for initial pairing between host device 11 and client device 12.

Network Interface 33 is a component of host device 11 that communicates with external devices, such as client device 12 and server 13, through an external network connection. Network interface 33 may comprise a wired connection to NAT 14(a), or may utilize a wireless LAN, BLUETOOTH® protocol, or some other compatible connection interface with NAT 14(a). In an exemplary embodiment of the present invention, network interface 33 may communicate with server 13 for rendezvous process 100, and client device 12 for direct peer-to-peer communication. In such an embodiment, processor 30 may direct network interface 33 to accept or reject incoming communications from external electronic devices, direct network interface 33 to send an appropriate communication to server 13 or client device 12.

Figure 4B:
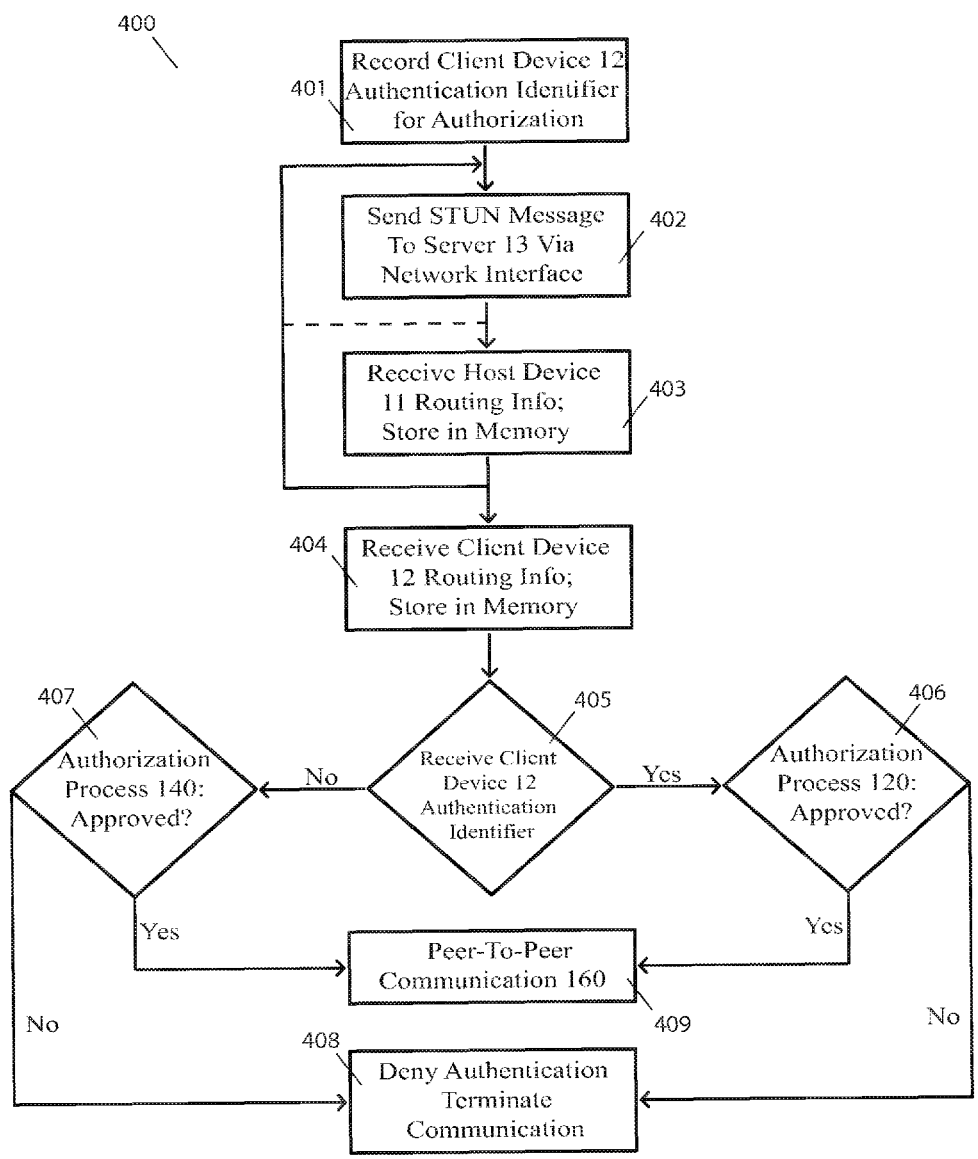
FIG. 4(b) illustrates a flow chart of a method utilized by a host communication device for establishing a peer-to-peer communication session with a client communication device.

FIG. 4(b) illustrates a flow chart of method 400 utilized by host device 11 for establishing a peer-to-peer communication session with client device 12. Method 400 is explained in the order shown below; however, the following steps may be taken in any other conceivable sequence without deviating from the scope of the present invention.

In step 401, host device 11 completes the initial pairing method with client device 12, as described in FIGS. 3(a) and 4(a). Once initial pairing has been completed, and the authentication identifier for client device 12 has been recorded, host device 11 proceeds to step 402.

In step 402, host device 11 sends STUN message 18(a) to UDP server 16 and TCP registration 19(a) to TCP server 17 via network interface 33. In an exemplary embodiment of the present invention, step 402 may be continuously repeated. In step 402, host device 11 continually updates server 13 with the routing information of host device 11, should it change.

In step 403, host device 11 receives the UDP public IP address of host device 11 from server 13 via network interface 33, in response to the STUN message 18(a) sent in step 402. Processor 30 stores the UDP public IP address of host device 11 within memory 31. In an exemplary embodiment of the present invention, step 403 updates host device 11 of its own UDP public IP address, should the address change. Step 403 may repeat continuously, as server 13 may repeatedly send responses to STUN messages sent in step 402. In step 404, host device 11 receives routing information 20(a), the routing information of client device 12 from server 13 via network interface 33. Processor 30 stores routing information 20(a) client device 12 within memory 31.

In step 405, host device 11 waits for the initial peer-to-peer communication from client device 12 via network interface 33. Should host device 11 receive request 21 from client device 12, host device 11 proceeds to step 406. Should host device 11 not receive request 21 to communicate and an authentication identifier from client device 12 within a set period of time, host device 11 proceeds to step 407. In an alternative embodiment of the present invention, host device 11 may proceed directly to step 407 without waiting for communication from client device 12.

In step 406, host device 11 performs authorization process 120, as previously described for FIG. 2(b). Host device 11 receives request 21 from client device 12 via network interface 33 along with an authentication identifier from client device 12. Should the authentication identifier transferred from client device 12 be stored in memory 31, processor 30 will approve client device 12 for peer-to-peer communication, instruct network interface 33 to send an approval message to client device 12, and host device 11 will proceed to step 409. However, should the authentication identifier not be stored in memory 31, or the identifier transferred was not authorized, processor 30 may deny client device 12 for peer-to-peer communication, and host device 11 will proceed to step 408.

In step 407, host device 11 performs authorization process 140 as previously described for FIG. 2(b). Host device 11 sends request 21 to client device 12 for its authentication identifier, to initiate a peer-to-peer communication session. Should client device 12 transfer its authentication identifier to host device 11, host device 11 may check memory 31 if the authentication identifier is approved. Should the authentication identifier transferred by client device 12 be stored in memory 31, processor 30 will approve client device 12 for peer-to-peer communication, instruct network interface 33 to send an approval message to client device 12, and host device 11 will proceed to step 409. However, should the authentication identifier not be stored in memory 31, or the identifier transferred was not authorized, processor 30 may deny client device 12 for peer-to-peer communication, and host device 11 will proceed to step 408.

In step 408, host device 11 denies client device 12 access because it is not authorized for peer-to-peer communication. Host device 11 may send a denial communication to client device 12 and terminate peer-to-peer communication. Finally, in step 409, host device 11 may send an approval message to client device 12, and begin peer-to-peer communication session for data transfer. In an exemplary embodiment of the present invention, should a peer-to-peer communication session conclude or end prematurely because of a disconnection or other network problems, host device 11 may reestablish a peer-to-peer communication session with client device 12 by performing steps 404-407 again to reauthorize client device 12 for peer-to-peer communication.

Figure 5A:
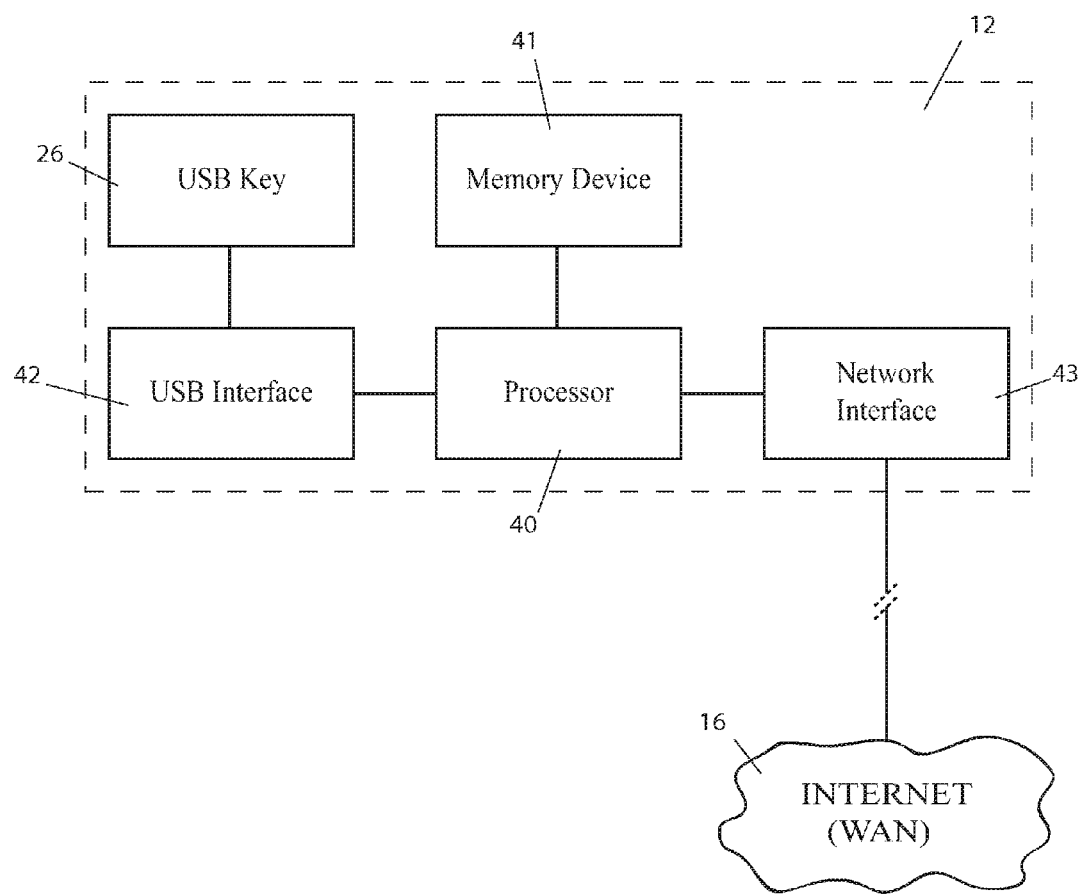
FIG. 5(a) illustrates a block diagram of an exemplary embodiment of a client communication device.

FIG. 5(a) illustrates a block diagram of an exemplary embodiment of the internal components of client device 12. FIG. 5(a) shows client device 12, comprising processor 40, memory 41, USB interface 42, USB key 26, and network interface 43, connected to an external network, such as WAN 16. Client device 12, however, may comprise other internal or external components and not depart from the scope of the present invention. Client device 12 is designed to initiate a peer-to-peer communication session with host device 11 over WAN 16.

Processor 40 is a component of client device 12 that governs the functionality of client device 12. All data inputs and command instructions from external devices through network interface 43 may ultimately be relayed through processor 40. In an exemplary embodiment of the present invention, processor 40 instructs network interface 43 to communicate with external devices.

Memory 41 is a component of client device 12 in which data is stored for peer-to-peer communication with host device 11. Processor 40 may access data stored in memory 41 for transmission through peer-to-peer communication, or for authorization of client device 12 with host device 11. Additionally, processor 40 may access memory 41 to record, modify, or delete data stored in memory 41. Data stored in memory 41 may be transferred through network interface 43 via processor 40.

USB Interface 42 is a component of client device 12 wherein external devices may be connected to client device 12 for access to an authentication identifier for the initialization of peer-to-peer communication with host device 11. In an exemplary embodiment of the present invention, USB interface 42 may comprise a USB receiver port, wherein USB key 26 may be plugged into USB interface 42 such that processor 40 may access the authentication identifier for authentication process 120 or authentication process 140, as previously described for FIG. 2(b). Additionally, processor 40 may instruct USB interface 42 to record the MAC address of host device 11 stored within the memory of USB key 26 for rendezvous between client device 12 and server 13.

USB key 26 is a component of client device 12 that may be initially paired for authorization with host device 11, as previously described for FIG. 3(a). USB key 26 may include the MAC address of host device 11, such that when connected to USB interface 42, processor 40 may request the routing information of host device 11 from server 13 to initiate a peer-to-peer communication session. Additionally, USB key 26 may store an authentication identifier, which may be initially transferred to host device 11 such that client device 12 may be authorized for peer-to-peer communication with host device 11. In an exemplary embodiment of the present invention, USB key 26 may connect with USB interface 42 such that processor 40 may access the authentication identifier and transfer it to host device 11 through network interface 43 for authorization to initiate peer-to-peer communication.

In an alternative embodiment of the present invention, client device 12 may not include USB key 26. In such an embodiment, when USB key 26 is connected to USB interface 42, processor 40 may copy the authentication identifier stored in USB key 26 to memory 41. As such, client device 12 may utilize the authentication identifier stored in memory 41 to be authorized for peer-to-peer communication with host device 11, should USB key 26 not be connected to client device 12. In another embodiment of the present invention, however, the authentication identifier stored in USB key 26 may be read-only, prohibiting processor 40 from storing the authentication identifier in memory 41.

Network Interface 43 is a component of client device 12 that communicates with external devices, such as host device 11 and server 13, through an external network connection. Network interface 43 may comprise a wired connection to NAT 14(b), or may utilize a wireless LAN, BLUETOOTH® protocol, or some other compatible connection interface with NAT 14(b). In an exemplary embodiment of the present invention, network interface 43 may communicate with server 13 for rendezvous process 100, and host device 11 for direct peer-to-peer communication. In such an embodiment, processor 40 may direct network interface 43 to accept or reject incoming communications from external electronic devices, direct network interface 43 to send an appropriate communication to server 13 or host device 11.

Figure 5B:
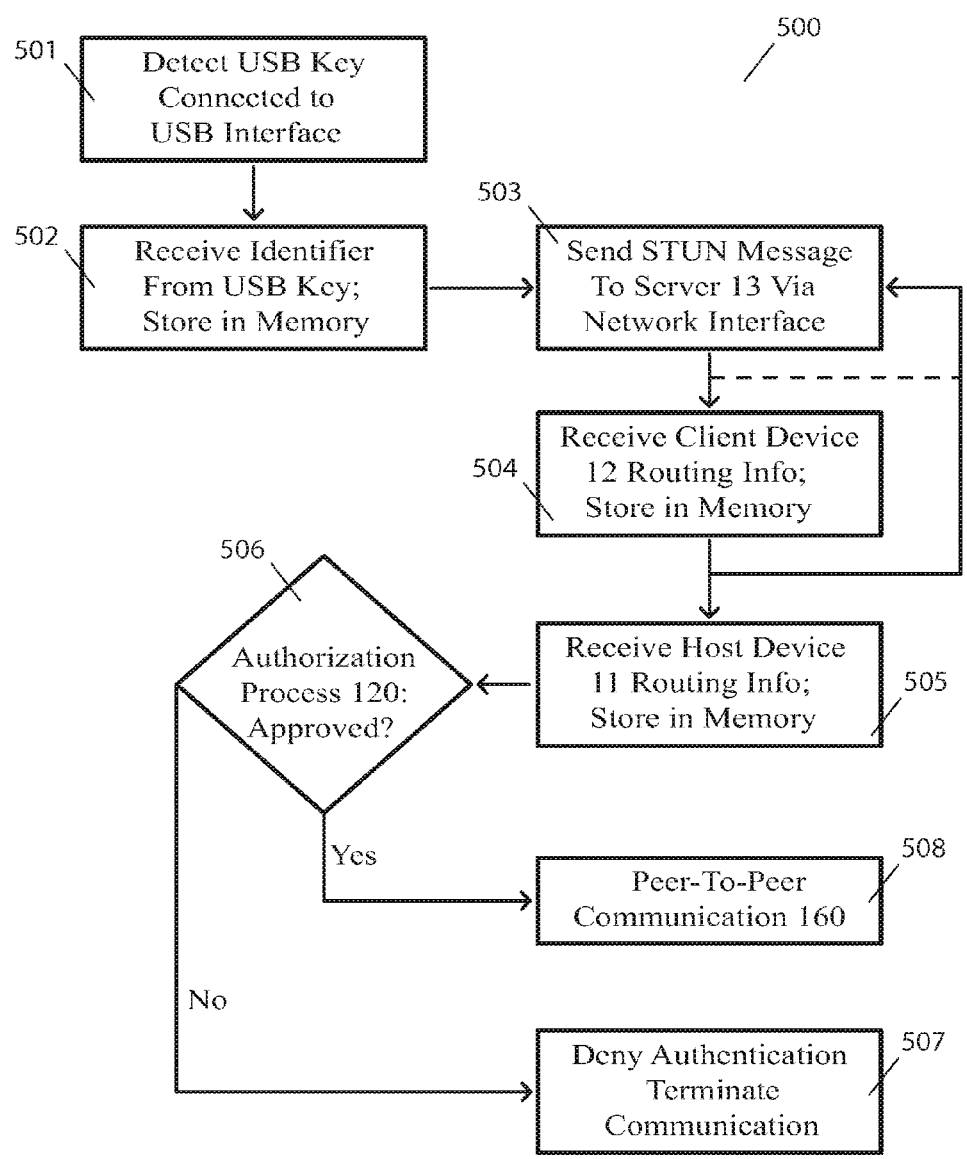
FIG. 5(b) illustrates a flow chart of a method utilized by a client communication device for establishing a peer-to-peer communication session with a host communication device.

FIG. 5(b) illustrates a flow chart of method 500 utilized by client device 12 for establishing a peer-to-peer communication session with host device 11. Method 500 is explained in the order shown below; however, the following steps may be taken in any other conceivable sequence without deviating from the scope of the present invention.

In step 501, USB key 26 is detected by processor 40 through USB interface 42. In an exemplary embodiment of the present invention, USB key 26 may be connected to client device 12 through USB interface 42. In alternative embodiments of the present invention wherein client device 12 does not comprise USB key 26 or USB interface 42, step 501 may be skipped. In step 502, processor 40 accesses USB key 26 through USB interface 42 and receives the authentication identifier and MAC address from USB key 26 necessary for peer-to-peer communication with host device 11. In one embodiment of the present invention, processor 40 may copy the authentication identifier and MAC address stored on USB key 26 to memory 41. In other embodiments of the present invention, USB key 26 may include software for peer-to-peer communication with host device 11, which may be run by processor 40.

In step 503, client device 12 sends STUN message 18(b) to UDP server 16 and TCP registration 19(b) to TCP server 17 via network interface 43. In an exemplary embodiment of the present invention, step 503 may be continuously repeated. In step 503, client device 12 continually updates server 13 with the routing information of client device 12, should it change.

In step 504, client device 12 receives the UDP public IP address of client device 12 from server 13 via network interface 43, in response to the STUN message 19(b) sent in step 503. Processor 40 stores the UDP public IP address of client device 12 within memory 41. In an exemplary embodiment of the present invention, step 504 updates client device 12 of its own UDP public IP address, should the address change. Step 504 may repeat continuously, as server 13 may repeatedly send responses to STUN messages sent in step 503. In step 505, client device 12 receives routing information 20(b) of host device 11 from server 13 via network interface 43. Processor 40 stores the routing information of host device 11 within memory 41.

In step 506, client device 12 performs authentication process 120, as previously described for FIG. 2(b). Client device 12 sends request 21 and its authentication identifier to host device 11 via network interface 43. Processor 40 then instructs network interface 43 to wait for a response from host device 11. Should client device 12 receive an authentication approval message from host device 11 via network interface 43, client device 12 may proceed to step 508. Should client device 12 receive an authentication denied message from host device 11 via network interface 43, client device 12 may proceed to step 507. Should client device 12 receive no response from host device 11 or should client device 12 receive a request for its authentication identifier from host device 11, client device 12 may repeat step 506.

In step 507, client device 12 received an authentication denied message from host device 11 via network interface 43, terminating peer-to-peer communication between host device 11 and client device 12. In one embodiment of the present invention, client device 12 may return to step 506 to request peer-to-peer communication.

Finally, in step 508, client device 12 may begin peer-to-peer communication and data transfer with host device 11, as client device 12 has been authorized for peer-to-peer communication. In an exemplary embodiment of the present invention, should a peer-to-peer communication session conclude or end prematurely because of a disconnection or other network problems, client device 12 may reestablish a peer-to-peer communication session with host device 11 by performing steps 505-508 again to reauthorize client device 12 for peer-to-peer communication.

Figure 6:
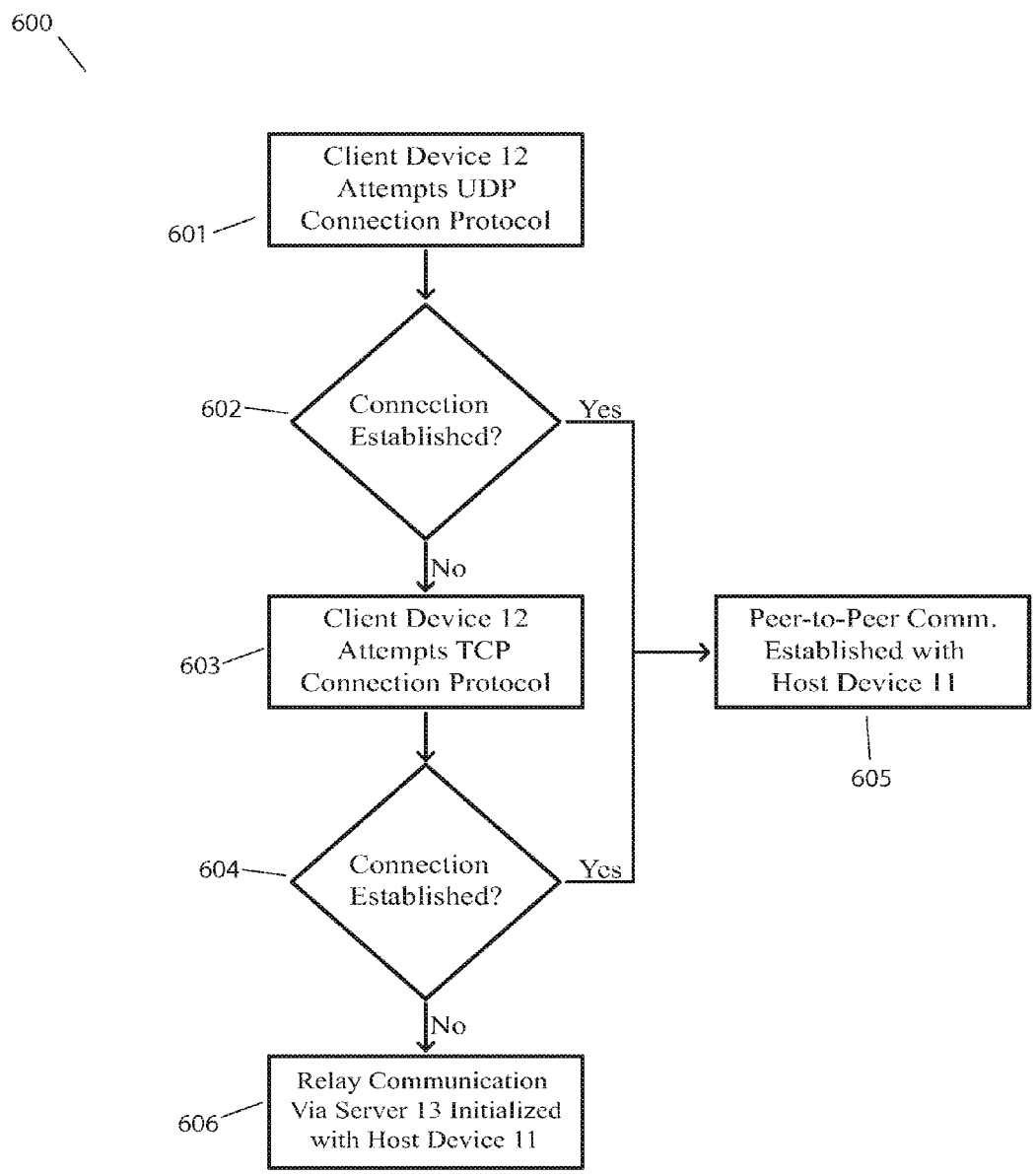
FIG. 6 illustrates a flow chart of a method utilized by client communication device for establishing a communication session with host communication device.

FIG. 6 illustrates a flow chart of method 600 utilized by client device 12 for establishing a communication session with host device 11. Method 600 is explained in the order shown below; however, the following steps may be taken in any other conceivable sequence without deviating from the scope of the present invention.

In step 601, client device 12 attempts to establish a peer-to-peer communication session with host device 11 via UDP connection protocol. In an exemplary embodiment, client device 12 attempts to initialize communication with host device 11 via the UDP public IP address and port of host device 11. Client device 12 may attempt this UDP connection because client device 12 was previously relayed the UDP public IP address and port of host device 11 by server 13 in routing information message 20(*b*). In such an embodiment, client device 12 may attempt to initialize UDP connection with host device 11 for 2 seconds.

In alternative embodiments of the present invention, client device 12 may attempt to receive communication from host device 11 via UDP connection protocol. In such embodiments, client device 12 may listen for communication via its UDP public IP address and port number for communication from host device 11.

Likewise, host device 11 may attempt to receive or send communication to client device 12 via UDP protocol. In an exemplary embodiment of the present invention, host device 11 may attempt to accept communication from client device 12 via its UDP public IP address and port for two seconds. In other embodiments, host device 11 may attempt to connect with client device 12 via UDP protocol for two seconds.

In step 602, client device 12 determines if peer-to-peer communication via UDP protocol has been established with host device 11. If client device 12 were to receive a connection acknowledgement from host device 11 that peer-to-peer communication has been established, then peer-to-peer communication via UDP protocol succeeded and client device 12 may proceed to step 605. If, however, client device 12 were not to receive a connection acknowledgement from host device 11, then peer-to-peer communication via protocol cannot be verified, and client device 12 proceeds to step 603.

In step 603, client device 12 attempts to establish a peer-to-peer communication session with host device 11 via TCP connection protocol. In an exemplary embodiment, client device 12 attempts to initialize a three-part handshake procedure with host device 11 via the TCP private IP address of host device 11. Client device 12 may attempt this TCP connection because client device 12 was previously relayed the TCP private IP address of host device 11 by server 13 in routing information message 20(*b*). In such an embodiment, client device 12 may attempt to initialize TCP connection with host device 11 for 2 seconds.

In alternative embodiments of the present invention, client device 12 may attempt to receive communication from host device 11 via TCP connection protocol. In such an embodiment, client device 12 may listen for communication via its TCP private IP address for communication from host device 11.

Likewise, host device 11 may attempt to receive or send communication to client device 12 via TCP protocol. In an exemplary embodiment of the present invention, host device 11 may attempt to accept communication from client device 12 via its TCP private IP address for two seconds. In other embodiments, host device 11 may attempt to connect with client device 12 via TCP protocol for two seconds.

In step 604, client device 12 determines if peer-to-peer communication via TCP protocol has been established with host device 11. If client device 12 were to receive a connection acknowledgement from host device 11 that peer-to-peer communication has been established, then peer-to-peer communication via TCP protocol succeeded and client device 12 may proceed to step 605. If, however, client device 12 were not to receive a connection acknowledgement from host device 11, then peer-to-peer communication via protocol cannot be verified, and client device 12 may proceed to step 606.

In some embodiments of the present invention, should client device 12 be unable to establish peer-to-peer communication with host device 11 via TCP protocol utilizing the TCP private IP address of host device 11, client device 12 may then attempt to initialize peer-to-peer communication with host device 11 via TCP protocol utilizing the TCP public IP address of host device 11. In such embodiments, client device 12 and host device 11 may repeat steps 603 and 604 utilizing the TCP private IP addresses of host device 11 and client device 12, respectively.

In step 605, a peer-to-peer communication session has been established between host device 11 and client device 12. In exemplary embodiments of the present invention, the connection protocol used to initialize the peer-to-peer communication session may be utilized during the peer-to-peer communication session between host device 11 and client device 12. For example, should client device 12 successfully establish connection with host device 11 utilizing the UDP connection protocol, client device 12 and host device 11 may then utilize the UDP connection protocol for communication and data transfer during their peer-to-peer communication session. Should the peer-to-peer communication session be terminated, client device 12 may attempt to reinitialize the communication session by returning to step 601.

In step 606, client device 12 utilizes server 13 to relay data and communication to and from host device 11 because peer-to-peer communication could not be established between host device 11 and client device 12 utilizing either the TCP or UDP connection protocols. In an exemplary embodiment, data may be transferred between host device 11 and client device 12 via relay over server 13. In alternative embodiments, should a peer-to-peer connection later be established, the relay connection with server 13 may be terminated.

In alternative embodiments of the present invention, client device 12 may attempt to establish peer-to-peer communication with host device 11 via TCP protocol before later attempting to establish peer-to-peer communication with host device 11 via UDP protocol. In such an embodiment, client device 12 may attempt communication via UDP protocol should communication via TCP protocol be unsuccessful.

In yet other embodiments of the present invention, client device 12 and host device 11 may initialize relay communication via server 13 prior to any attempt to establish a peer-to-peer communication session. In such embodiments, data transfer may be accomplished via relay server until a peer-to-peer communication session is established. Should a peer-to-peer communication session be established between client device 12 and host device 11, data transfer via relay through server 13 may be discontinued.

An apparatus and method for establishing a peer-to-peer communication session between electronic devices over a wide area network has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A method of establishing a peer-to-peer communication session with a client device by a host device, comprising:
   detecting an attached USB compatible device;
   receiving a first authentication information from the attached USB compatible device;
   sending routing information of the host device to a server coupled to a wide area network;
      wherein the host device is located behind a Network Address Translator ("NAT") device;
   receiving routing information of the client device from the server;
   communicating with the server to maintain availability of a port;
   receiving a second authentication information of the client device from the client device via the wide area network;
   comparing the first authentication information with the second authentication information to authenticate the client device;
   establishing a peer-to-peer communication session with the client device via the wide area network if the client device is authenticated for peer-to-peer communication; and
   transmitting data to the client device via the peer-to-peer communication session;
      wherein routing information of the host device comprises any one or more of a TCP public IP address and port number, a UDP public IP address and port number, a private IP address and port number, and a MAC address of the host device.

2. The method of claim 1, wherein routing information of the client device comprises:
   any one or more of the TCP public IP address and port number, the UDP public IP address and port number, and the private IP address and port number of the client device; and
   the MAC address of the host device.

3. The method of claim 2, wherein the host device receives the routing information of the client device via the wide area network.

4. The method of claim 1, further comprising transmitting a STUN message query to the server.

5. The method of claim 4, further comprising the host device receiving the UDP public IP address and port number of the host device in response to the STUN message query.

6. The method of claim 1, wherein the second authentication information of the client device is received through an open private port.

7. The method of claim 1, wherein the second authentication information of the client device is received through an open public port.

8. The method of claim 1, wherein the second authentication information comprises an identification code, serial number, username and password, or other unique identification information stored to identify and authorize the client device for peer-to-peer communication.

9. The method of claim 1, further comprising transmitting a request for the second authentication information to the client device via the wide area network.

10. The method of claim 9, wherein the request for the second authentication information is sent to the client device using the private IP address of the client device.

11. The method of claim 9, wherein the request for the second authentication information is sent to the client device using the TCP public IP address of the client device.

12. The method of claim 9, wherein the request for the second authentication information is sent to the client device using the UDP public IP address of the client device.

13. The method of claim 9, wherein the request for the second authentication information comprises a request for an identification code, serial number, username and password, or some other unique identification information stored by the host device to identify an authorization of the client device for peer-to-peer communication.

14. A host device for establishing a peer-to-peer communication session with a client device coupled to a wide area network, adapted to:
   detect an attached USB compatible device;
   receive a first authentication information from the attached USB compatible device;
   send routing information of the host device to a server coupled to the wide area network;
      wherein the host device is located behind a Network Address Translator ("NAT") device;
   receive routing information of the client device from the server;
   communicate with the server to maintain availability of a port;
   receive a second authentication information of the client device from the client device via the wide area network;
   compare the first authentication information with the second authentication information to authenticate the client device;
   establish a peer-to-peer communication session with the client device via the wide area network if the client device is authenticated for peer-to-peer communication; and
   transmit data to the client device via the peer-to-peer communication session;
      wherein routing information of the host device comprises any one or more of a TCP public IP address and port number, a UDP public IP address and port number, a private IP address and port number, and a MAC address of the host device.

15. The device of claim 14, wherein routing information of the client device comprises:

any one or more of the TCP public IP address and port number, the UDP public IP address and port number, and the private IP address and port number of the client device;

and the MAC address of the host device.

16. The device of claim 14, wherein the host device is adapted to send a STUN message query to the server for the UDP public IP address of the host device.

17. The device of claim 14, wherein the host device is adapted to receive the second authentication information of the client device via an open private port.

18. The device of claim 14, wherein the host device is adapted to receive the second authentication information of the client device via an open public port.

19. The device of claim 14, wherein the second authentication information comprises an identification code, serial number, username and password, or other unique identification information stored by the host device to identify an authorize the client device for peer-to-peer communication.

20. The device of claim 14, wherein the host device is adapted to send a request for the second authentication information to the client device via the wide area network.

21. The device of claim 20, wherein the host device is adapted to send a request for the second authentication information to the client device using the private IP address of the client device.

22. The device of claim 20, wherein the host device is adapted to send a request for the second authentication information to the client device using the TCP public IP address of the client device.

23. The device of claim 20, wherein the host device is adapted to send a request for the second authentication information to the client device using the UDP public IP address of the client device.

24. The device of claim 20, wherein the request for the second authentication information comprises a request for an identification code, serial number, username and password, or some other unique identification information stored by the host device to identify an authorization of the client device for peer-to-peer communication.

25. A non-transitory computer-readable medium including codes executable by a processor, for:

detecting an attached USB compatible device;

receiving a first authentication information from the attached USB compatible device;

sending routing information of a host device to a server coupled to a wide area network;
  wherein the host device is located behind a Network Address Translator ("NAT") device;

receiving routing information of a client device from the server;

communicating with a server to maintain availability of a port;

receiving a second authentication information of the client device from the client device via the wide area network;

comparing the first authentication information with the second authentication information to authenticate the client device;

establishing a peer-to-peer communication session with the client device via the wide area network if the client device is authenticated for peer-to-peer communication; and transmitting data to the client device via the peer-to-peer communication session;
  wherein routing information of the host device comprises any one or more of a TCP public IP address and port number, a UDP public IP address and port number, a private IP address and port number, and a MAC address of the host device.

* * * * *